United States Patent

Schultz

[15] 3,648,470

[45] Mar. 14, 1972

[54] MATERIALS COMPOSITION ARRANGEMENT FOR THERMOELECTRIC HEATING AND COOLING

[72] Inventor: Gary E. Schultz, 18415 Prairie Street, Northridge, Calif. 91324

[22] Filed: May 28, 1970

[21] Appl. No.: 41,309

[52] U.S. Cl. ....................62/3, 136/203

[51] Int. Cl. ....................F25b 21/02

[58] Field of Search ....................136/203, 204, 205; 62/3

[56] References Cited

UNITED STATES PATENTS 3,248,889 5/1966 Zimmerman ....................62/3

3,391,030 7/1968 Beaver ....................136/203

*Primary Examiner*—William J. Wye

*Attorney*—Fraser & Bogucki

[57] ABSTRACT

A plurality of alternating junctions of two types arranged in a series configuration. The first junction type is comprised of two materials in overlapping arrangement. The second junction type is also comprised of two materials and additionally has a third material therebetween. Current flow through the junction produces a Peltier heating or cooling effect at the first type of junction. Either no thermal effect or both Peltier heating and cooling occur at the second type of junction which cancel out. The effect is the cumulative Peltier effects produced at the first type of junction.

12 Claims, 3 Drawing Figures

INVENTOR
GARY E. SCHULTZ

BY Herzig & Walsh
ATTORNEYS

MATERIALS COMPOSITION ARRANGEMENT FOR THERMOELECTRIC HEATING AND COOLING

SUMMARY OF THE INVENTION

This invention relates generally to a materials composition arrangement and more particularly to a materials composition arrangement for heating or cooling utilizing the Peltier effect.

Currently, it is possible to provide a heating effect by the use of a resistance arrangement such as found in a typical electric heating blanket. This arrangement is disadvantageous because resistances in this application are rather fragile devices and have a tendency to decompose and become inoperative after a period of time. Furthermore, an electric heating blanket can only be used for heating and cannot be used during the warmer periods of the year to benefit the user.

Peltier energy, as discussed in the textbook entitled "Thermoelectricity: Introduction to the Principles" by D. K. C. MacDonald and published by John Wylie & Sons, Inc. 1962 edition, is evolved or absorbed in the junction region between two conductors. The Peltier effect is a function of the thermoelectric properties of the two different materials which are brought together to form a junction. Each individual material makes its own characteristic contribution to the Peltier effect.

The Peltier energy that is transferred at any junction is proportional to the quantity of current crossing the junction, and the effect is reversed when the electric current is reversed. The Peltier energy is evolved or absorbed over the actual junction region between the conductors. The junction size is immaterial with regard to the Peltier effect produced. Differences in junction size only provide for a different energy dissipation per unit area and total energy dissipation is unaffected.

Generally a typical arrangement of materials for utilizing the Peltier effect involves the technique of overlapping materials. By having an overlapping arrangement the current flow can continue uninterrupted.

One difficulty that has arisen through the use of the Peltier effect is that when one material overlaps two other materials, at the junction of the first set of materials, energy is either absorbed or evolved depending upon the current flow while at the other junction the reverse effect is occurring. A technique commonly utilized to minimize the effects of either the undesired energy absorption or evolvement is to position the junctions contributing the undesired effect in a remote location. For example, in U.S. Pat. No. 3,099,137, the heating and cooling junctions are placed on opposite sides of the garment and the junctions on the outside of the garment do not contribute to the effect produced by the junctions on the inside of the garment.

If the foregoing technique is not utilized, the net effect along the conductive strip can still be either energy absorption or evolvement but at various junctions along the conductive strip there is a decidedly opposite effect occurring, which tends to make the conductor strip unsuitable for use in making people more comfortable. The presence of distinctly hot and cold areas along the strip can occur even though the net effect of the strip is either absorption or evolvement of energy.

The arrangement of the present invention can be utilized for the heating or cooling of a person directly through a garment or blanket by use of the Peltier effect. The device of the present invention utilizes three materials to achieve a cumulative Peltier heating or cooling effect. Two of the materials are placed in an overlapping arrangement as previously done. The succeeding junction, which is generally much smaller than the primary junction, has a third material therebetween. The use of this third material may allow both Peltier energy absorption and evolvement to occur within a very small region, thereby effectively cancelling one another and leaving the net effect to be that of the effect produced at the primary junctions and producing no areas that are opposite to the net effect of the arrangement. Alternatively, the third material may be electrically conductive and thermally nonconductive such that the net thermal effect of the strip will result from the effect produced at the primary junction.

An indefinite number of junctions can be utilized for the desired heating or cooling application. Furthermore, the junctions and the materials can be either rigid or flexible to allow for different user applications, for example, an electric blanket or wall paneling which would be used for heating and cooling and a heat sink for a semiconductor device which would desirably cool the device.

In applications such as wall paneling, which is of a fixed construction, it is possible to use materials which are highly fragile such as semiconductor materials, because it is possible to obtain large thermoelectric property differences from these materials. In an application such as an electric blanket, it is necessary that the materials utilized be flexible, and this is a necessary consideration in determining the exact materials used.

In the light of the foregoing, it is a primary object of this invention to provide an arrangement for heating or cooling utilizing the Peltier effect.

It is a further object of this invention to provide an arrangement utilizing three materials to produce the heating or cooling effect by way of the Peltier effect.

Still another object of this invention is to provide an arrangement for heating or cooling wherein two of the materials form a primary junction for producing the heating or cooling effect desired while at a secondary junction comprised of two smaller junctions utilizing the first two materials and the third material therebetween, such that either no thermal effect is produced or the net Peltier effect at this junction is cancelled, so as not to contribute to the overall effect provided by the arrangement.

Further objects and additional advantages of the invention will become apparent from the following detailed description and annexed drawings wherein.

DESCRIPTION OF THE PREFERRED EMBODIMENTS

Figure 1:
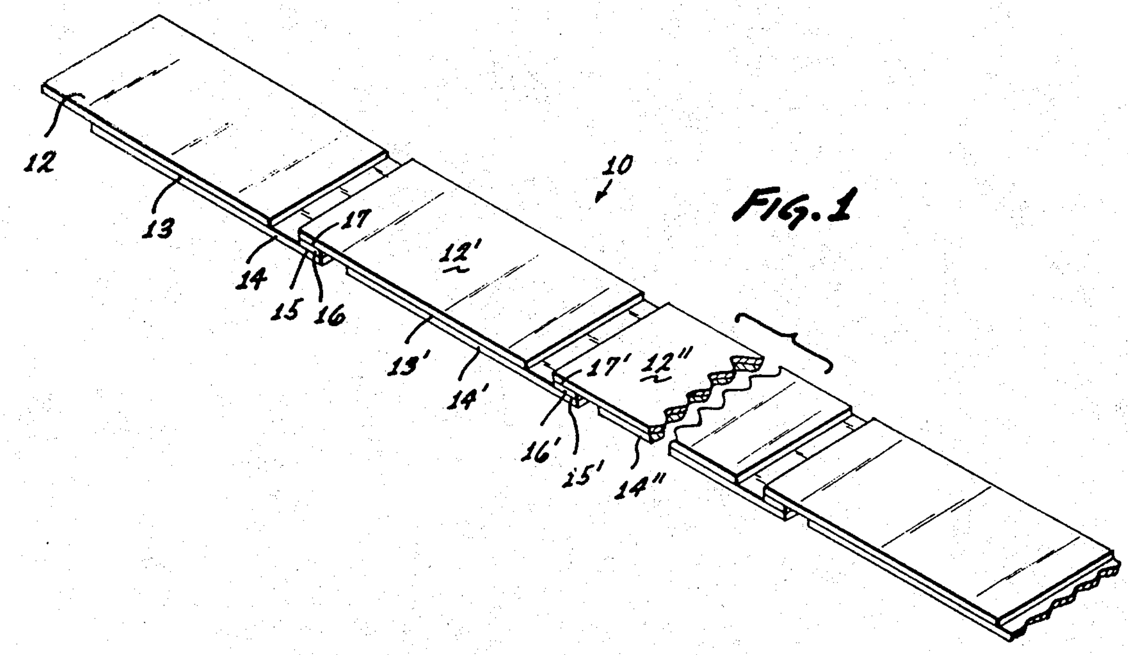
FIG. 1 is a perspective view of the arrangement of the present invention.
Figure 2:
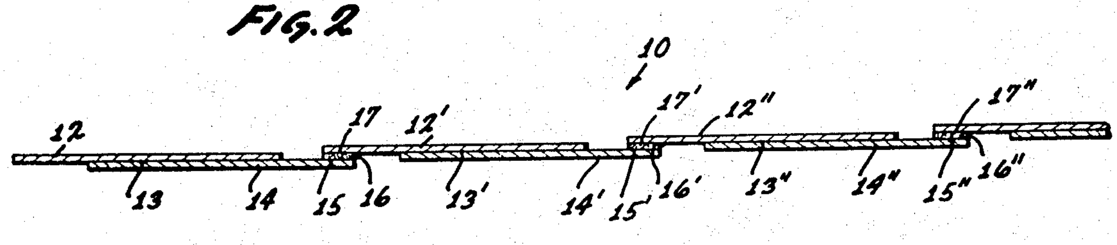
FIG. 2 is a side view of the device of the present invention.

Turning now to FIG. 1 of the drawings, a portion of the arrangement of the present invention which may be typically a conductor strip 10 is shown. Materials 12 and 14 which are dissimilar conductor materials are placed in contacting relationship with each other to form junction 13. These materials are placed in an overlapping relationship to allow interconnection to adjacent junction areas.

Figure 3:
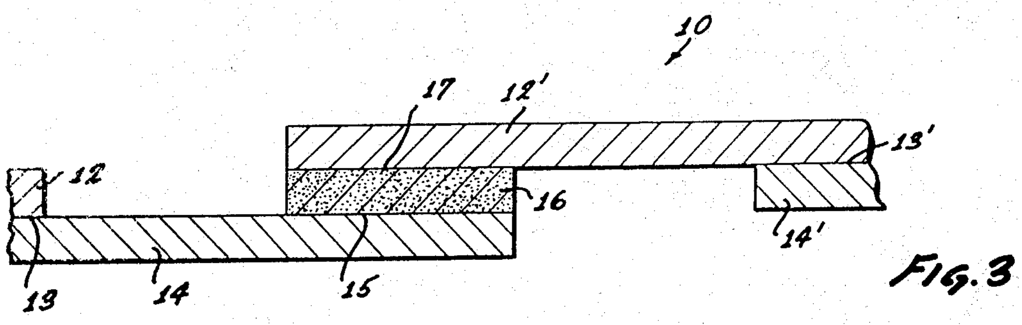
FIG. 3 is an enlarged side view of a junction of three materials of the present invention.

FIG. 3 illustrates more clearly the junction between material 14 and the successive materials. Material 14 is shown having a material 16 positioned thereover to form junction 15. Placed over material 16 is material 12' forming junction 17. It can be seen that the junctions 15 and 17 are much smaller in area than the junction 13 for a reason which will now be explained.

Current is provided through the conductor strip by connections made at the ends of the strip in a conventional manner. Current flows from material 12 through junction 13 to material 14 produces a Peltier effect which may be either heating or cooling, depending on the current flow. The Peltier effect that occurs between the two materials is dependent upon the magnitude of the current flow and the thermoelectric properties of each material. If current flow in a first direction produces heating, then the reverse is true for current flow in the opposite direction.

Current flow proceeds from material 14 to material 16 through junction 15. This produces a second Peltier effect which is dependent upon the thermoelectric properties of each material used. Current flow then proceeds from material 16 to material 12' through junction 17. This produces a Peltier effect which is designed to be opposite to the effect produced at junction 15. The Peltier effects produced at junctions 15 and 17 are desirably cancelled out by each other.

Due to the choice of materials, it may be difficult to obtain an exact cancelling effect at the junctions 15 and 17. If this is the situation, the next desirable arrangement is one where the materials selected have a very slight net effect consistent with the energy effect produced by current flow through junction 13.

However, current flow continues uninterrupted from material 14 to material 12' even though the Peltier effects therebetween are cancelled. Thus, the net effect is a Peltier heating or cooling that is produced at junction 13.

The Peltier energy created at junctions 15 and 17 is rather small due to the choice of materials used to form the junction and no effect is made therefrom to the overall cumulative effect of the conductive strip. Rather, junction 13 which constitutes a large surface area becomes the sole contributor to the effect created by the conductive strip. Similar effects occur throughout the length of the conductor strip at junctions 13', 15', 17', 13'', 15'', and 17'', etc.

A further feature of the invention involves the use for material 16, a material that is virtually a thermal nonconductor but is a good electrical conductor. Examples of such materials are various forms of fiber, expanded/compressed and suspended carbon, and graphite where impregnants or additives may be added to suitably adjust the degree of thermal nonconductance such as graphite felt. Also, plastic conductors may be utilized which consist of finely divided carbon or graphite suspended in a mixture of water and a polyhydric alcohol boriborate such as glycol boriborate. It is also feasible to use for material 16 a combination of graphite felt and a semifluid plastic conductor. In this combination, the felt is impregnated with the plastic conductor such that the electrical conductivity of the felt may be increased while retaining the desired thermal nonconductivity of the element.

Thus, depending on the current flow through the strip, a temperature gradient, either heating or cooling, occurs along the entire strip; and the Peltier effect produced is thus cumulative in that the effects created at each of the junctions 13, etc., are additive. The more junctions that exist along the conductive strip, the greater the total effect that is realized by the strip.

In order to prevent movement of the materials at the junctions, it is possible to fasten or weld the junctions together in a conventional manner. Typically, mechanical crimping is utilized and prevents translational movement of the junction. Furthermore, a covering such as plastic surrounds the junction to insulate it and prevent vertical separation.

Material 12 is preferably a conductive metal such as copper. Material 14 is necessarily a dissimilar metal such as iron, constantin, or typically stainless steel. Material 16, etc., is a third dissimilar metal and is preferably graphites or a form thereof as previously discussed. The particular metals utilized depends on their thermoelectric properties, and it is desirable that adjacent materials have dissimilar properties to obtain a large Peltier effect when current flows through them. It is also feasible to utilize thermoelectric alloys and semiconductor materials having appropriate thermoelectric properties as well as thermal nonconductors that are electrically conductive.

The actual dimensions of materials 12 and 14 are such as to form a junction so as to allow a relatively large area with respect to the electron mean flow of the current. This allows the Peltier effect to be the sole source of energy and negates the effects of joule or resistance heating.

While it is desirable to have the materials as small as possible so as to have the advantage of flexibility, if the materials are too small, then joule or resistance heating effects would occur. This would seriously affect the temperature gradient produced along the strip when the current flow is in a direction so that cooling should occur.

Therefore, the reversible Peltier effect, which may be either heating or cooling depending upon the direction of current flow, occurs at the junction 13; and any Peltier effects created at junctions 15 and 17 are thereby cancelled or negligible or nonexistent in this region. This allows the strip to be used in applications so as to avoid areas on the strip that are of a distinctly different temperature range than the overall net effect created by the strip.

From the foregoing, those skilled in the art will readily understand the nature of the invention, its construction, and operation and the manner in which it achieves and realizes the objects and advantages as set forth in the foregoing.

The foregoing disclosure is representative of preferred forms of the invention and is to be interpreted in an illustrative rather than a limiting sense, the invention to be accorded the full scope of the appended claims.

What is claimed is:

1. A Peltier effect system comprising a group of similar junctions formed between metals, a second group of composite junctions formed between materials such that when current passes therethrough, the Peltier effect cancels, all junctions being connected in series electrically, with junctions of the first and second groups alternating, whereby the Peltier effect of all first group junctions is cumulative.

2. A system in accordance with claim 1, including a first metal and a second metal, wherein said first metal and said second metal are positioned in overlapping relationship to provide a junction of said first group therebetween, whereby current flow in a first direction therethrough produces a first energy effect.

3. A system in accordance with claim 2, further including a third metal, wherein said third metal is placed on said second metal to form a junction in said second group, whereby current flow in a first direction therethrough produces a predetermined energy effect.

4. A system in accordance with claim 3, further including a metal similar to said first metal positioned over said third metal and forming a junction therewith in said second group, whereby current flow in a first direction therethrough produces a predetermined energy effect opposing the effect produced by current flow through said second metal and third metal, thereby cancelling the Peltier effect produced thereby.

5. A materials composition strip in accordance with claim 2, wherein said first metal is typically copper.

6. A materials composition strip in accordance with claim 2, wherein said second metal is typically stainless steel.

7. A materials composition strip in accordance with claim 3, wherein said third metal is typically graphite.

8. A materials composition arrangement for thermoelectric heating and cooling comprising a plurality of a first type of junction, each of said junctions including a first type of material in overlapping relationship and a plurality of a second type of junction, each of said last mentioned junctions including said first and second types of material in overlapping relationship and further including a third material therebetween whereby passage of current through said first type of junction produces a heating effect and passage of current through said second type of junction produces heating and cooling thereby cancelling so that the cumulative effect of the arrangement results from the effect produced by said plurality of first type of junction.

9. A materials composition strip in accordance with claim 8, wherein passage of current in the opposite direction permits said strip to cool.

10. A Peltier effect system comprising a group of similar junctions formed between metals, a second group of composite junctions formed between materials such that when current passes therethrough, no thermal effect occurs, all junctions of the first and second groups alternating, whereby the Peltier effect of all first group junctions is cumulative.

11. A system in accordance with claim 10, including a first metal and a second metal, wherein said first metal and said second metal are positioned in overlapping relationship to provide a junction of said first group therebetween, thereby current flow in a first direction therethrough produces a first energy effect.

12. A system in accordance with claim 10, further including a third metal, wherein said third metal is placed on said second metal to form a junction in said second group, whereby current flow in a first direction therethrough produces a predetermined energy effect.

* * * * *